Figure 1:
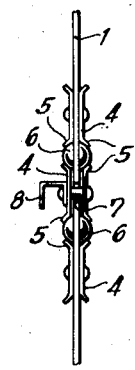

April 22, 1958 W. REICHE ET AL 2,831,413
BALL-GUIDE MEANS, PARTICULARLY FOR PHOTOGRAPHIC CAMERAS
Filed March 16, 1955 2 Sheets-Sheet 1

INVENTORS
WILLI REICHE AND
FRITZ FAULHABER
BY Mock & Blum
ATTORNEYS

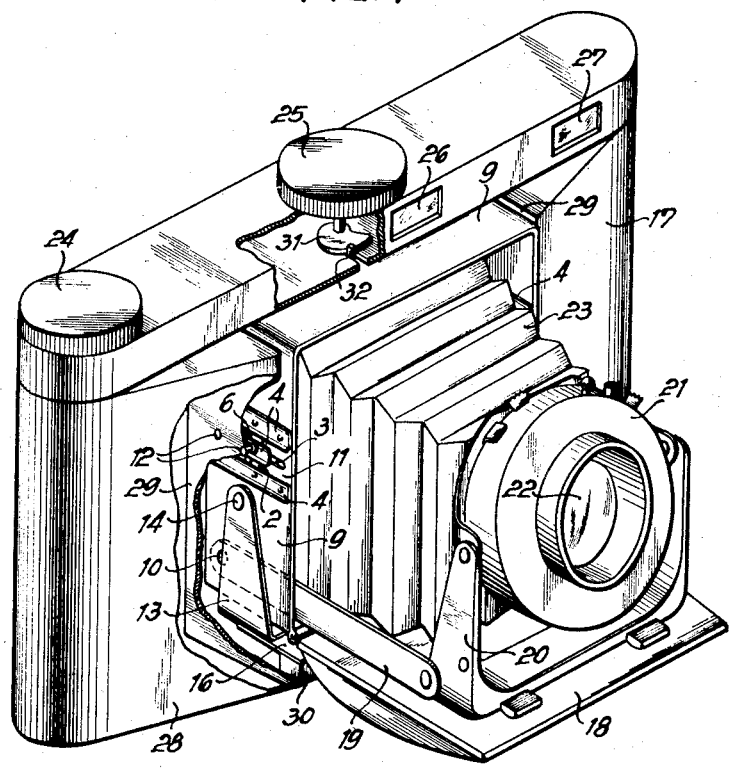

United States Patent Office 2,831,413
Patented Apr. 22, 1958

2,831,413
BALL-GUIDE MEANS, PARTICULARLY FOR PHOTOGRAPHIC CAMERAS

Willi Reiche, Braunschweig, and Fritz Faulhaber, Schonaich, Wurttemberg, Bezirk Boblingen, Germany, assignors to Voigtländer Aktiengesellschaft, Braunschweig, Germany, a corporation of Germany Application March 16, 1955, Serial No. 494,692

Claims priority, application Germany March 20, 1954

2 Claims. (Cl. 95—45)

This invention relates to ball guides for photographic cameras and has particular relation to a straight-line guide arrangement for the spreader-box of photographic cameras.

Several types of straight-line ball guide arrangements have been known previously. Such arrangements which are available for use in precision constructions, are not satisfactory in cases in which the required guide arrangements should operate without play and, for inexpensive manufacture, should consist of parts prepared without precision work. This is particularly true in connection with guide means, which are essentially shorter than the member to be guided.

The main object of the present invention is to provide a ball guide arrangement which operates without play and preferably consists of parts made by non-cutting shaping. It provides the possibility of favorable solutions of guide arrangement problems, which previously had to be solved in often not satisfactory manner, e. g. by the use of steering or guide constructions. An example in this connection is the spreader-box, and also the tube, in photographic cameras. The term "spreader-box" is used to denote the conventional arrangement of a box, frame or the like, to which spreaders are connected for advancing the objective and holding it in the picture-taking position. These parts of the camera must be provided for sharp focusing of the objective with means for exact displacement without tilting, relative to the picture window of the camera. The known drive constructions for effecting guiding in the camera, as well as the simple constructions of sliding tubes, do not always operate with the necessary exactness, in view of the play occurring in these constructions. Moreover, particularly in the case of an advanced tube, in which, in view the relatively small over-all depth of the camera, the length of the slide guide is always essentially limited, jamming may occur in the guide means upon gripping the far advanced tube. For the same reason, it has not been hitherto possible to guide the spreader-box, the width of which essentially exceeds its length, by simple straight-line guide means, in the camera.

According to the present invention the above outlined difficulties are avoided by providing the parts to be guided relative to each other, with ledges elastic transversely to the direction of guiding, said ledges being manufactured by non-cutting shaping and arranging balls under initial tension between said ledges.

According to a preferred embodiment of the invention, one of the parts to be guided is a plane wall, which is provided with two rows of elongated apertures for receiving the balls. On each of both sides of the wall, parallel to this wall, two elastic ledges are arranged, each of which has an edge portion bent in an angle, covers the outer, longer sides of the apertures and is in engagement with the balls. Between the two rows of elongated apertures an additional row of slots is arranged, through which a bolt passes with play. The bolts connect two additional elastic ledges arranged parallel to the wall on each of the sides, in the middle line of the ledges in such manner, that the ledges are movable in the direction of guiding, with play to the wall. The edges of these two last mentioned ledges are likewise bent outward in an angle. They cover the inner long edges of the apertures and are likewise in engagement with the balls so that all together the balls are journalled between the bent elastic edges of the ledges. Thereby, the thin straps of the plane wall, left between the individual apertures, form the stops for the displacement of the balls, while the member guided relative to the wall is limited in its movement by abutment of the above mentioned bolts at the end of the above mentioned slots. In order to compensate for the weakening caused by the apertures and slots, the plane wall, the length of which is limited in most cases, can be provided, if necessary, with a reinforcement, which spans the range of the ball guide.

In order to further reduce the manufacturing expenses of the ball guide, preferably all elastic ledges have the same design, so that only one tool is necessary for their manufacture. In this construction all ledges are provided with two bent edges, whereby the outer edges of the four outer ledges are not used.

If a member, the width of which considerably exceeds its length, e. g. the spreader-box of a photographic camera, has to be guided, it is preferable to provide it with a ball guide arrangement on each of its two opposite sides.

In such case, according to the present invention an additional device is used for preventing lead on one side, of the part to be guided, e. g. under the effect of a force acting on one side only. Such device consists, for example, of a conventional rocking lever construction.

The invention is illustrated in the drawings which show by way of example, and without limitation, two embodiments of the invention.

Figure 2:
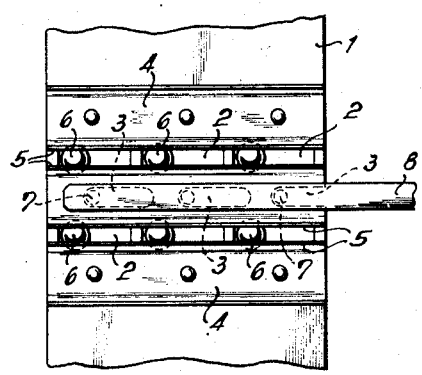
Figure 3:
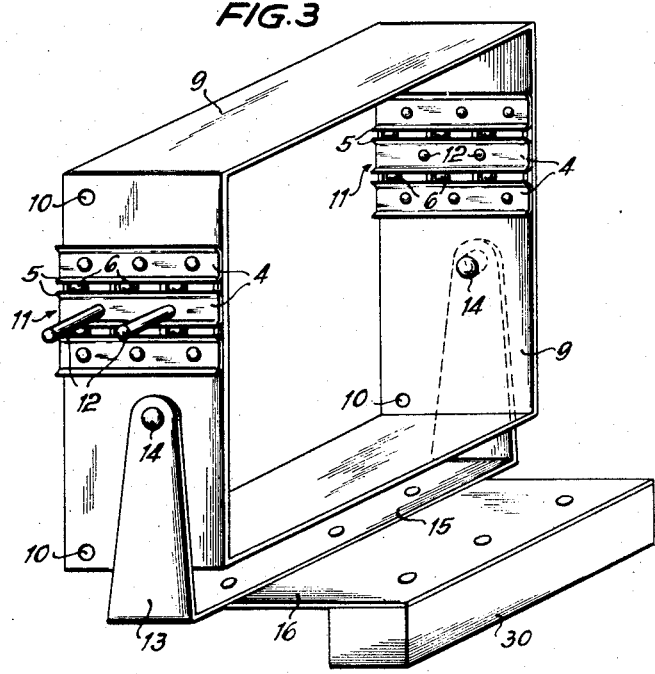

Figure 1 shows a straight-line ball guide arrangement in plane view; Figure 2 illustrates in side-view the structure shown in Figure 1; Figure 3 is the perspective view of the spreader-box of a photographic camera, said spreader-box being provided with two ball guides and means for maintaining parallelism of the box; Figure 4 illustrates a photographic camera with a built-in spreader-box of the type shown in Figure 3.

Referring now to the drawings in detail, in Figure 1 and 2 reference symbol 1 denotes a plane wall which is provided with 2 rows of elongated apertures 2 and an intermediate row of slots 3. To each of both sides of wall 1, two elastic ledges 4, are fastened by riveting, the border or rim portions 5 of which are outwardly bent in an angle, one of said portions covering in each case the outer longitudinal side of apertures 2 and is in engagement with balls 6, which are located in said apertures. Rivets 7 extend through slots 3 and connect two additional ledges 4, each of which is located on one side of wall 1 and is provided with outwardly bent edges, in such manner that said ledges are displaceable with play to wall 1, without the occurrence of contact. These ledges too are in engagement with balls 6 by means of their outwardly bent edges 5. As a member which is displaceable relative to wall 1 without play, a rod 8 is connected, for example by riveting, with ledges 4 located between the rows of balls. The embedding of balls without play between the bent edges of the ledges is brought about by such arrangement and measurements that relative to their line of attachment the ledges occupy in their operative position a slightly braced position, which is not shown in Figure 2.

Figure 3 illustrates the spreader-box 9 of a photographic camera, in perspective view. The points of attack of the spreaders (which do not appear in Figure 3)

are shown at 10, 10. On each of the two opposite sides, a ball guide 11 is arranged. The middle ledges 4 are held together by two rivet pins 12, which are outwardly extended and serve simultaneously for fastening the spreader frame to the camera body.

A spreader-box guided in this manner is rigid as far as swinging or tilting about its transverse axis is considered, but it is not rigid to swinging or tilting about its vertical axis, owing to its being guided between the elastic ledges. The spreader-box, which is connected over the spreaders with the camera objective, must be guided strictly without tilting or swinging. In order to prevent an oblique position of the spreader-box 9, i. e. a lead of one of its sides relative to the other, the box is enclosed by a U-shaped bow or frame 13. On both sides provided with ball guides, the spreader-box is hingedly connected at 14 with a leg of member 13, said legs extending transversely to said ball guides. At the same time, cross-piece 15 of member 13 is journalled swingably and without play on the camera body about an axis which extends transversely to the guide direction and also movably in vertical plane, by means of a wide leaf spring 16, which points in the direction of guiding the box. Therefore, upon displacement of the spreader-box, member 13 will be caused to swing and will be also displaced and, owing to its peculiar arrangement and fastening, it will prevent any difference in the movement of the two sides of the spreader-box.

Figure 4 illustrates a roll-film camera 17 in perspective view. Arranged in the camera is spreader-box 9, which forms a structural unit with base-board 18, spreaders 19, objective carrier 20, a shutter 21, objective 22 and bellows 23, said entire unit being jointly adjustable for sharp focusing, relative to the camera. Reference symbol 24 denotes the knob for advancing the film and 25 denotes the knob for adjusting the distance. 26 and 27 are the windows of the range-finder. In the broken away portion of the camera front wall 28, one of the ball guides 11 of the spreader-box 9 can be seen. The middle pair of ledges 4 is held together by rivets 12, which are firmly connected also with casing wall 29. Spreader-box 9 is thus journalled on both sides in the camera body. The two outer pairs of ledges 4, which are riveted to the spreader box, are guided by the intermediately arranged balls 6 on the middle pair of ledges 4, which are stationary on the casing. U-shaped member 13 provided for guiding the spreader-box without tilting, is hingedly connected with the spreader-box at 14, and is journalled swingably or tiltably without play and movably in vertical direction on a bar 30, which is stationary in the camera casing.

Adjustment of spreader-box 9 is brought about over an eccentric disc 31, which is firmly connected with knob 25 for adjustment of the distance. A pin 32 of the spreader-box permanently engages under spring effect said eccentric disc 31. In Figure 4, spreader-box 9 is shown in its farthest advanced position, which corresponds to focusing for a near object.

The ball-guide can be arranged also in a reversed manner according to the invention. In this case, referring to Figure 4, both outer pairs of ledges 4 would be firmly connected to casing wall 29 and apertures 2 for receiving the balls, as well as slots 3 for the passage of rivets 12, would be also located in this wall 29. The middle pair of ledges 4 would then be firmly connected with spreader box 29.

It will be understood that this invention is not limited to the specific elements, designs, constructions and other details described above and illustrated in the drawings and can be carried out with various modifications without departing from the scope of the invention, as defined in the appended claims.

The edge portions of the ledges are bent as described above, e. g. under an angle of about 45°, and the ledges are preferably made of spring steel sheet.

What is claimed is:

1. A ball-guide arrangement in combination with a photographic camera having a picture-taking objective which is displaceably arranged relative to the camera body for adjustment to distance and held at the front end of a spreader system, the rear end of which is connected with a rectangular spreader box displaceably guided on walls of the camera casing; a first wall and a second wall opposite to said first wall, of said spreader box being each provided with a first, second and third row of elongated openings extending in the direction of displacement of the objective, said rows being spaced from, and parallel with, each other, the openings in said first wall being aligned with those in said second wall; the openings in said first and third row in said first and second wall being adapted to receive balls; pairs of ledges of equal shape and dimensions being arranged on opposite sides of said first wall and second wall along said rows of openings, the longitudinal edges of said ledges being outwardly bent in an angle, for forming guiding supports for balls placed in said openings, two pairs of said ledges being fastened to the respective walls of the spreader box, while the intermediate pair of ledges is fastened to the camera casing by means of rivets passing through the intermediate row of openings.

2. A combination as claimed in claim 1, comprising a U-shaped frame, the legs of which enclose part of the spreader box; a leaf spring extending in the direction of displacement of the spreader box being fastened at one of its ends to the cross-piece connecting the legs of said frame, while the other end of the leaf spring is fastened to the camera body.

References Cited in the file of this patent

UNITED STATES PATENTS

| 2,028,718 | Heine | Jan. 21, 1936 |
| 2,417,523 | Simpson | Mar. 18, 1947 |
| 2,607,817 | Peterlik | Aug. 19, 1952 |
| 2,726,585 | Faulhaber | Dec. 13, 1955 |

FOREIGN PATENTS

| 614,847 | Germany | Oct. 28, 1935 |
| 753,287 | Germany | Sept. 28, 1953 |
| 1,076,844 | France | Apr. 21, 1954 |